United States Patent
Schwarz

(10) Patent No.: US 7,218,075 B2
(45) Date of Patent: May 15, 2007

(54) ELECTRONIC CIRCUIT FOR STARTING A SINGLE PHASE INDUCTION MOTOR

(75) Inventor: Marcos Guilherme Schwarz, Joinville - SC (BR)

(73) Assignee: Empresa Brasileira De Compressores S.A. - Embraco, Joinville-SC (BR)

( * ) Notice: Subject to any disclaimer, the term of this patent is extended or adjusted under 35 U.S.C. 154(b) by 0 days.

(21) Appl. No.: 10/785,728

(22) Filed: Feb. 23, 2004

(65) Prior Publication Data

US 2004/0263109 A1 Dec. 30, 2004

Related U.S. Application Data

(63) Continuation of application No. 10/332,496, filed on Jan. 8, 2003, now abandoned, which is a continuation of application No. PCT/BR01/00085, filed on Jul. 5, 2001.

(30) Foreign Application Priority Data

Jul. 25, 2000 (BR) .................................. 0003448

(51) Int. Cl.
*H02P 1/16* (2006.01)
*H02P 1/26* (2006.01)
(52) U.S. Cl. ...................... 318/778; 318/773; 318/774; 318/776; 318/777; 318/779
(58) Field of Classification Search ......... 318/700–800
See application file for complete search history.

(56) References Cited

U.S. PATENT DOCUMENTS

| | | | | |
|---|---|---|---|---|
| 3,916,274 A | * | 10/1975 | Lewus | ........................ 318/787 |
| 4,081,727 A | * | 3/1978 | Green | ........................ 318/814 |
| 4,468,604 A | * | 8/1984 | Zaderej | ....................... 318/786 |
| 4,604,563 A | * | 8/1986 | Min | ............................ 318/786 |
| 4,605,888 A | * | 8/1986 | Kim | ............................ 318/786 |
| 4,782,278 A | | 11/1988 | Bossi et al. | |
| 5,051,681 A | * | 9/1991 | Schwarz | ..................... 318/786 |
| 5,302,885 A | * | 4/1994 | Schwarz et al. | ............ 318/781 |

FOREIGN PATENT DOCUMENTS

EP 0 878 901 A2 11/1998

\* cited by examiner

*Primary Examiner*—Lincoln Donovan
*Assistant Examiner*—Tyrone Smith
(74) *Attorney, Agent, or Firm*—Darby & Darby

(57) ABSTRACT

An electronic circuit for starting a single phase induction motor, of the type containing a rotor and a stator with at least one running coil (B1) and one starting coil (B2), for operating jointly with an alternating current source (F), comprising: a trigger electronic switch; a trigger circuit (TR) of said trigger electronic switch; and a blocking circuit (BL) for controlling the trigger pulses of the trigger electronic switch, said blocking circuit (BL) sustaining its blocking state while there is voltage being induced to the coils of the motor (M) by rotation of the rotor, maintaining said blocking state for a certain time after said induced voltage has been substantially reduced.

24 Claims, 3 Drawing Sheets

ELECTRONIC CIRCUIT FOR STARTING A SINGLE PHASE INDUCTION MOTOR

CLAIM OF PRIORITY

This patent application claims the benefit of priority, under 35 U.S.C. § 1.120, as a continuation of U.S. Non-Provisional Patent Application Ser. No. 10/332,496, filed Jan. 8, 2003, now abandoned titled "ELECTRONIC CIRCUIT FOR STARTING A SINGLE PHASE INDUCTION MOTOR," which is a national phase continuation under 35 U.S.C. § 371 of PCT/BR01/00085 filed Jul. 5, 2001, published as WO 02/09264 on Jan. 31, 2002.

FIELD OF THE INVENTION

The present invention refers to an electronic circuit for starting a single phase induction motor, more specifically for starting induction motors having electronic circuits with a starting electronic switch.

BACKGROUND OF THE INVENTION

Single phase induction motors are widely used, due to their simplicity, strength and high performance. They are used in household appliances, such as refrigerators, freezers, air conditioners, hermetic compressors, washing machines, pumps, fans, as well as in some industrial applications.

These single phase induction motors are normally provided with a cage type rotor and a coiled stator having two windings, one being for the running coil and the other for the starting coil.

During normal operation, the running coil is supplied with an alternating voltage and the starting coil is temporarily supplied at the beginning of the operation, creating a turning magnetic field in the air gap of the stator, a necessary condition to accelerate the rotor and promote starting.

This turning magnetic field may be obtained by supplying the starting coil with a current that is time-displaced in relation to the current flowing in the running coil, preferably at an angle close to 90 degrees.

This time displacement between the currents flowing in both coils is achieved by constructive characteristics of the coils, or by installing an external impedance in series with one of the coils, but typically in series with the starting coil. Typically, the value of the current flowing in the starting coil during the starting operation of the motor is high, being necessary to use a switch to interrupt this current after the time required for promoting acceleration of the motor has elapsed.

In motors in which high efficiency is required, said starting coil is not completely disconnected upon completion of the starting period. A capacitor, namely a running capacitor, is kept in series with said starting coil, providing enough current to increase the maximum torque of the motor and the efficiency thereof.

For a motor having such configuration, employing a permanent impedance in series with the starting coil during the normal operation of the motor, some starting devices of the PTC or electronic types are known, as described in U.S. Pat. No. 5,051,681.

The known prior art starting circuits using a PTC as a starting device have some inconveniences, such as high energy consumption, as described in Brazilian document PI201210.

As described in U.S. Pat. No. 5,051,681, the starting circuits having an electronic starting device usually employing a triac, although not having problems of energy consumption like the circuits using PTC, have the inconvenience of being susceptible to voltage variations and, with the occurrence of voltage transients or determined conditions in which power supply to the motor is cut off, conducting the circuit to restart the motor, regardless of the powering condition in which said motor is still found, allowing the occurrence of current overload in the starting circuit, resulting in burns of determined components thereof due to overheating.

DISCLOSURE OF THE INVENTION

It is a general object of the present invention to provide an electronic circuit for starting a single phase induction motor, with a simple construction and low cost which, without changing the condition of energy consumption of the motor, avoids damages to the motor components due to undue voltage overload resulting from transients, disturbances and interruptions of power supply caused by the power source of the motor.

Another object of the present invention is to provide a starting circuit, such as mentioned above, which may be used with a running (or permanent) capacitor, or another impedance installed in series with the starting coil of the motor.

A further object of the present invention is to provide a circuit, such as mentioned above, whose construction allows the use of two connecting terminals.

These objects are achieved by an electronic circuit for starting a single phase induction motor, of the type containing a rotor and a stator with at least one running coil and one starting coil, for operating jointly with an alternating current source, comprising: a trigger electronic switch; a trigger circuit for said trigger electronic switch; and a blocking circuit for controlling the trigger pulses of the trigger electronic switch, said blocking circuit sustaining its blocking state while there is voltage being induced in the coils of the motor by rotation of the rotor, maintaining said blocking state for a certain time after said induced voltage has been substantially reduced.

BRIEF DESCRIPTION OF THE DRAWINGS

The invention will be described below, with reference to the attached drawings, in which.

BEST MODE OF CARRYING OUT THE INVENTION

Figure 1:
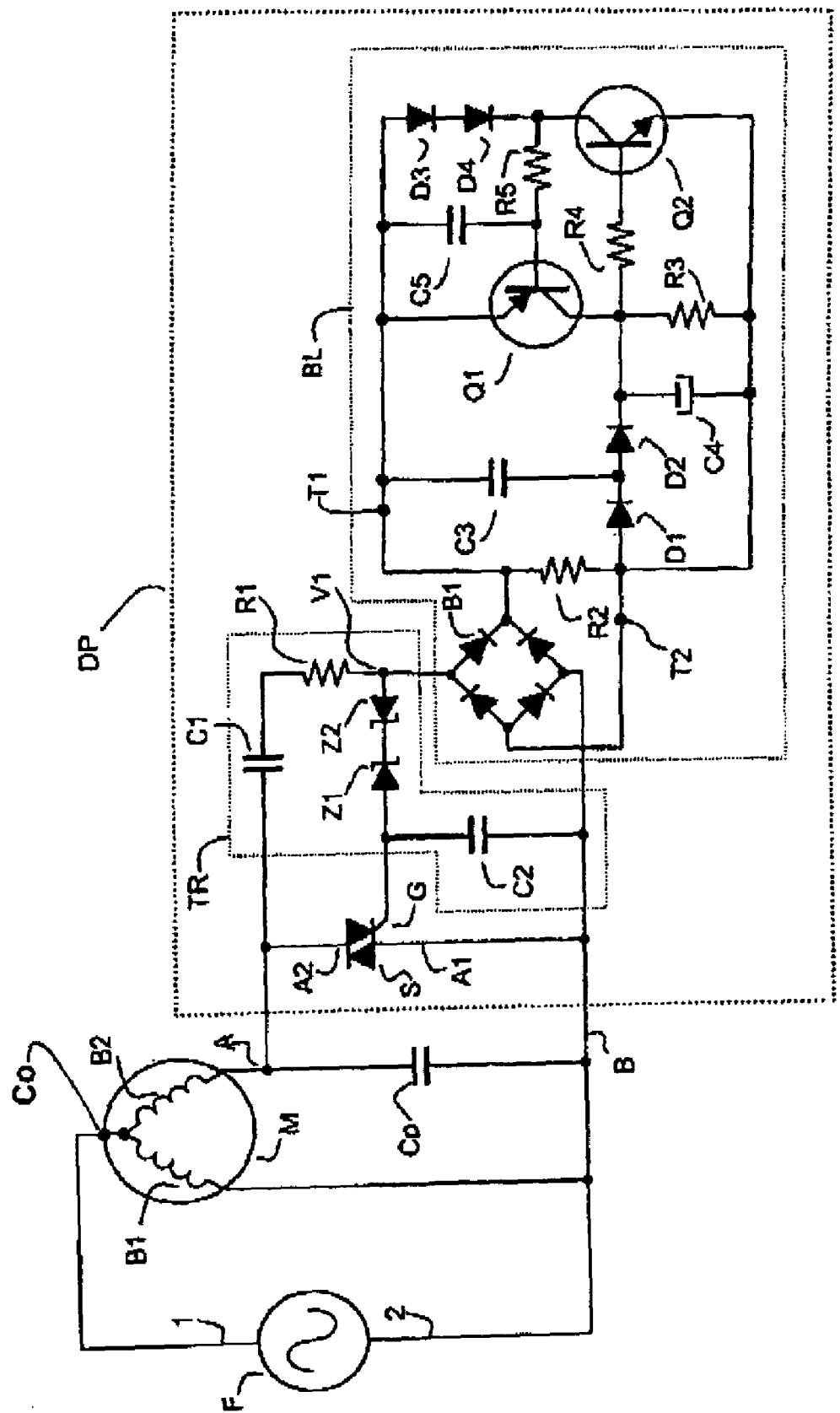
FIG. 1 shows, schematically, a complete electronic circuit of a first embodiment of the invention.
Figure 2:
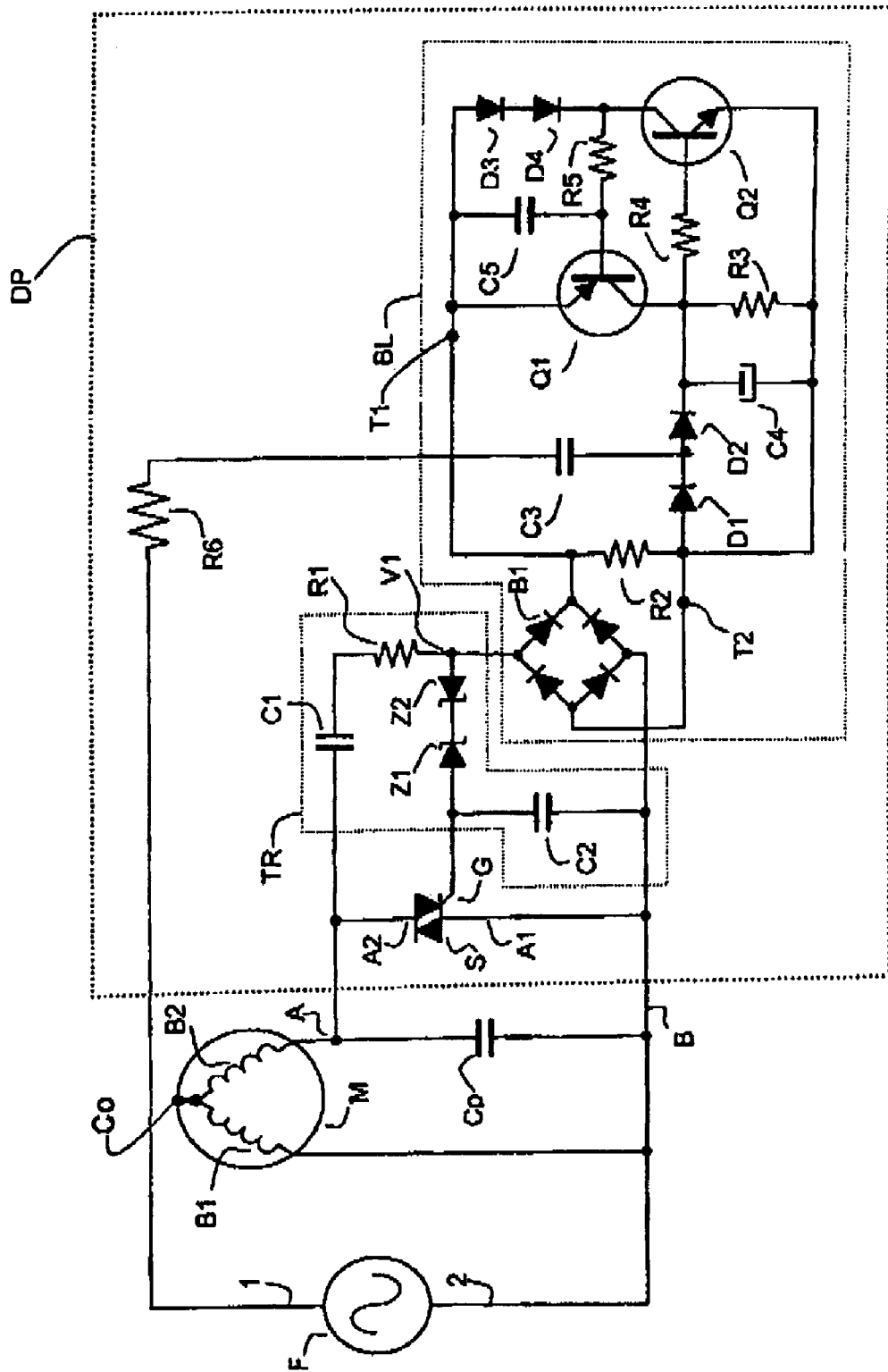
FIG. 2 shows, schematically, a second embodiment of the electronic circuit of the present invention.

The present invention describes an electronic circuit for starting a single phase induction motor, or motor M, of the type containing a rotor and a stator, which are not illustrated, with at least one running coil B1 and a starting coil B2, operating in conjunction with a source F of alternating current, as illustrated in FIGS. 1 and 2.

According to the illustrations, the present invention is applied to a starting circuit DP comprising: a trigger electronic switch; a trigger circuit TR of said trigger electronic switch, and a blocking circuit BL, for controlling the trigger pulses of the trigger electronic switch, to be described below.

According to the present invention, the blocking circuit BL presents a power blocking condition of the trigger pulses of the trigger electronic switch, to be discussed later and which is sustained while induced voltage exists in the windings of the motor M, by rotation of the rotor, said blocking state being maintained for a certain time after said induced voltage has been substantially reduced.

According to the present invention, the blocking circuit BL includes electronic switch elements, which are maintained in a situation of blocking the trigger pulses of the trigger electronic switch, by means of a timer of said blocking circuit BL to be described below. In the present solution, the elements of the electronic switch are maintained in a blocking situation by voltage saturation thereof.

In the illustrated constructions, the trigger electronic switch is, for example, a triac S and the timer is a charge element, which is supplied by the starting circuit DP (FIG. 1) and which may be also connected to the common point CO that connects the coils of motor M, as illustrated in FIG. 2.

In the constructions illustrated in FIGS. 1 and 2, the source F has terminals 1 and 2, which are respectively connected to the running coil B1 of the motor M and to a common point CO of both the running coil B1 and the starting coil B2.

The starting coil B2 is also connected to a terminal A of the starting circuit DP, and a terminal B of said starting circuit DP is connected to the terminal 2 of the source F, a running capacitor Cp being connected between the starting coil B2 and the terminal 2 of source F.

Between the terminals A and B of the starting circuit DP is connected the triac S, so that a first anode A1 thereof is connected to the terminal 2 of source F, through terminal B of the starting circuit DP, a second anode A2 is connected to the starting coil B2 of motor M and to a running capacitor Cp through the terminal A of said starting circuit DP and the trigger terminal G connected to the trigger circuit TR.

Immediately after motor M is energized by the source F, the voltage between terminals A2 and A1 of triac S begins to increase.

This voltage increase between terminals A1 and A2 of triac S makes current to flow through the trigger circuit TR.

According to the illustrations in FIGS. 1 and 2, the trigger circuit TR comprises: a first capacitor C1 having one of its terminals connected to the second anode A2 of triac S, and another terminal connected to a terminal of a first resistor R1, while the other terminal of said first resistor R1 is connected to the anode of a first Zener diode Z1 with its cathode connected to the cathode of a second Zener diode Z2, the anode of said second Zener diode Z2 being connected to the trigger terminal G of triac S, which is connected to a first terminal of a second capacitor C2 of the trigger circuit TR and which has its second terminal connected to the first anode A1 of triac S.

The current flowing through the first resistor R1 and first capacitor C1 is essentially limited by the value of the latter.

The second capacitor C2 is provided between the trigger terminal G and the terminal A1 of triac S and consists of a low impedance for the high frequency current components, avoiding the accidental triggering of the triac.

The trigger current of the triac S will flow through resistor R1 and first capacitor C1, finding a way to flow through the first and second Zener diodes Z1 and Z2 and through trigger terminal G of triac S, causing firing thereof and the consequent current conduction between its terminals A1 and A2.

According to the present invention, the first and second Zener diodes Z1 and Z2 have a Zener voltage that is high enough to avoid current conduction through said Zener diodes when the blocking circuit BL is in its blocking state. In this solution, the Zener voltage of the first and second Zener diodes may be higher than 5 volts (V).

The conduction of triac S allows current to flow from terminal 2 of source F to terminal A of the starting circuit DP, energizing the starting coil B2 of motor M.

At the beginning of each half-cycle of the alternating voltage supplied by source F, occurs the beginning of voltage variation between the terminals A1 and A2 of triac S, causing firing thereof through the trigger circuit TR, making triac S to conduct alternating current, characterizing a conduction state between terminals A and B of the starting circuit DP.

According to the illustrations in FIGS. 1 and 2, the blocking circuit BL consists of a complete rectifier bridge B1, having: a first input terminal connected to a common point connecting the anode of the first Zener diode Z1 with the first capacitor C1; a second input terminal connected to the first anode A1 of triac S; a positive output terminal connected to a terminal of a second resistor R2, to a terminal of a third capacitor C3, to the emitter of a first transistor Q1, for example of the PNP type, to a terminal of a fifth capacitor C5 and to the anode of a third rectifier diode D3; a negative output terminal connected to the other terminal of the second resistor R2, to the anode of a first rectifier diode D1, to the terminal of a fourth capacitor C4, to the terminal of a third resistor R3 and to the emitter of a second transistor Q2, for example of the NPN type.

The cathode of the first rectifier diode D1 is connected to the other terminal of the third capacitor C3 and to the anode of a second rectifier diode D2, the cathode of said second rectifier diode D2 being connected to the other terminal of the fourth capacitor C4, to the other terminal of the third resistor R3, to a terminal of a fourth resistor R4 and to the collector of the first transistor Q1, the other terminal of the fourth resistor R4 being connected to the base of the second transistor Q2, the base of the first transistor Q1 being connected to the other terminal of the fifth capacitor C5 and to a terminal of a fifth resistor R5, the other terminal of said fifth resistor R5 being connected to the collector of the second transistor Q2 and to the cathode of a fourth rectifier diode D4, the anode of said fourth rectifier diode D4 being connected to the cathode of the third rectifier diode D3.

In the present solution, the transistors define the elements of the electronic switch of the blocking circuit BL. When the first and second transistors Q1 and Q2 are not conducting, the maximum voltage at point V1 is essentially equal to the voltage of the first and second Zener diodes Z1 and Z2 plus the conduction voltage of the trigger terminal G of triac S which is typically around 1.5V. The voltage of the first and second Zener diodes Z1, Z2 is usually selected to be around 5V, making the maximum voltage, observed at a point V1 defined between the first resistor R1 and the rectifier bridge B1 at the intersection with the second Zener diode Z2, be around 6.5V.

In the preferred construction of the present invention, as illustrated in FIG. 1, the wave rectifier bridge B1 has its positive output terminal connected to a point T1 of the blocking circuit BL and its negative output terminal connected to a point T2 of said blocking circuit BL, between said points T1 and T2 being connected the resistor R2, guaranteeing the voltage between said points to be annulated when no current is coming from the rectifier bridge B1. During the initial running period TX of the motor M immediately after energized by source F, the voltage between the points V1 and A1 is in the form of a pulsed wave, as indicated in FIG. 3, with pulses having an amplitude essentially defined by summing up the value of the Zener voltage of the first and second Zener diodes Z1, Z2, plus the conduction voltage of the trigger terminal G of triac S.

Figure 3:
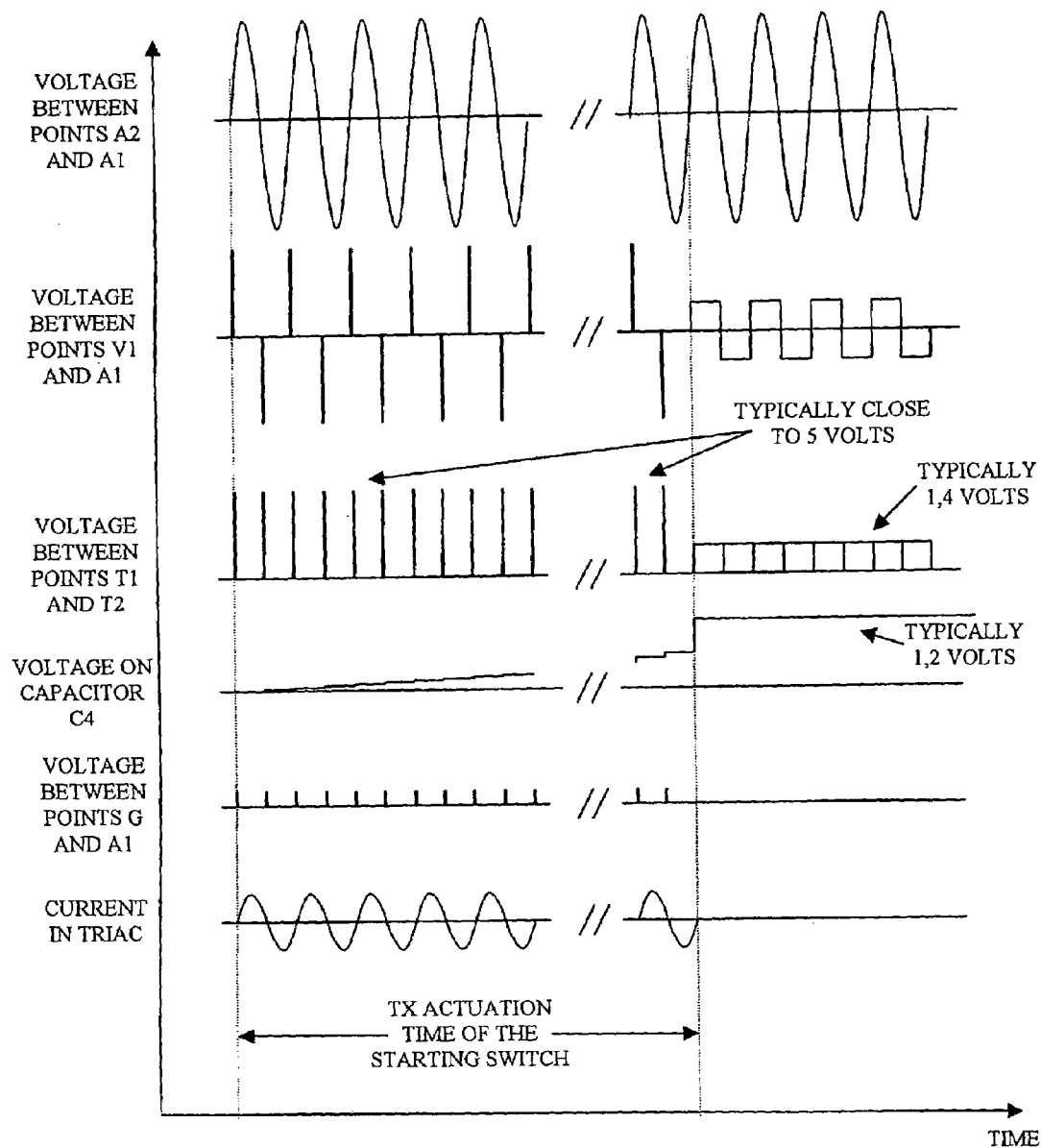
FIG. 3 shows, schematically, electric responses observed over time in different points of the electronic circuit of the present invention.

During this same initial running period TX of motor M, the voltage between the points T1 and T2 of the blocking circuit BL are pulsed with positive polarity, as indicated in FIG. 3.

In the embodiment illustrated in FIG. 2, the third capacitor C3 of the blocking circuit BL has a terminal connected to the starting coil B2 through a resistor R6, forming a passage to the electric current through the second rectifier diode D2 up to the fourth capacitor C4, which is the timer of the blocking circuit BL.

During the initial period TX, the current flows through the resistor R6 and third capacitor C3, which provoke the gradual voltage increment on the fourth capacitor C4, as indicated in FIG. 3.

The second rectifier diode D2 allows current to flow only to increment the voltage on the fourth capacitor C4, during the time interval in which the voltage in terminal 1 of the source F is increasing, the first rectifier diode D1 allowing the current to flow through the third capacitor C3, when the voltage in point 1 of the source F is decreasing, re-establishing the initial voltage condition on said third capacitor C3.

The voltage on the fourth capacitor C4 is increased)by small steps, the amplitude of said steps being defined essentially by the proportion between the capacitances C3 and C4 and by the voltage derivative in terminal 1 of the source F.

In the embodiment of FIG. 1, during the initial period TX, the voltage pulses between the points T1 and T2 cause the current to flow through the third capacitor C3, provoking the gradual voltage increment on the fourth capacitor C4, as indicated in FIG. 3. The second diode D2 allows the current to flow only to increase the voltage on the fourth capacitor C4, during a time interval in which the pulse voltage is increasing, the first rectifier diode D1 allowing the current to flow through the third capacitor C3 when the pulse voltage is decreasing, re-establishing the initial condition of the voltage on said third capacitor C3. The voltage on the fourth capacitor C4 is increased by small steps, the amplitude of said steps being defined essentially by the proportion between the capacitances of the third and fourth capacitors C3 and C4 and by the voltage characteristics in point T1.

According to the illustrations in FIGS. 1 and 2, the fourth capacitor C4 is connected in parallel with the third resistor R3, which is responsible for the discharge of the fourth capacitor C4 when the system is turned off and the motor is in a resting condition. This time constant for the discharge of the fourth capacitor C4 should be superior to a complete cycle of the alternating voltage coming from source F.

As illustrated in FIG. 3, the voltage on the fourth capacitor C4 increases, until reaching a value sufficient to polarize the base-emitter junction of the second transistor Q2, said value being around 0.6V, making current to flow through the collector of said second transistor Q2, coming essentially from the base of the first transistor Q1 and the fourth diode D4. This current flowing through the base of the first transistor Q1, on its turn, causes current to flow by the collector-emitter junction of said first transistor Q1, in order to further increase the voltage on the fourth capacitor C4. This process occurs in the form of an avalanche, defining the end of period TX represented in FIG. 3. This takes the first and second transistors Q1 and Q2 to saturation, establishing a final balance state in which the collector of the second transistor Q2 has a voltage value close to 0.2V in relation to the point T2, making voltage in point T1 to be essentially limited to the value of the voltage drop on the third and fourth rectifier diodes D3 and D4 added to the 0.2V value that is present in the collector of the second transistor Q2, resulting typically in about 1.4V.

In this final balance state, after the time period TX has elapsed, the voltage on the fourth capacitor C4 is essentially equal to the maximum voltage on the point T1 minus the voltage drop on the emitter-collector junction of the first transistor Q1, resulting typically in 1.2V, a value that is greatly superior to the minimum value needed for polarizing the base-emitter junction of the second transistor Q2, guaranteeing the saturation thereof.

The value of the current at the base of the second transistor Q2 is limited by the fourth capacitor C4 and the current at the base of the first transistor Q1 is limited by the fifth resistor R5. The circuit is provided with a fifth capacitor C5 installed between the point T1 and the base of the first transistor Q1, avoiding the occurrence of abrupt voltage variations at the base of said transistor, preventing high frequency noises coming from external electrical noises from causing the polarization of said transistor in an undue moment.

After this time period TX has elapsed, the final balance state described above limits the voltage in point T1 to a value typically close to 1.2 V, limiting the voltage between points V1 and A1 to a peak value typically near 2.4 V, avoiding current to flow through the first and second diodes Z1 and Z2, which typically present a Zener voltage of about 5V, thus preventing the trigger current from flowing through terminal G of triac S, avoiding the current to flow across terminals A1 and A2 of said triac S, characterizing the blocking state of the starting switch of the motor, i.e., characterizing the current regimen operational period of the motor M.

In this state, after the period TX has elapsed, the saturation of the first and second transistors Q1, Q2 is assured by the running condition itself, due to the voltage amplitude observed between points T1 and T2, which is high enough to maintain the fourth capacitor C4 charged with a voltage level greatly superior to the minimum required to start the avalanche saturation process of the first and second transistors Q1 and Q2. Thus, while there is voltage between terminals A and B of the starting device TR, the blocking circuit BL will have its blocking state sustained by the saturation of the first and second transistors Q1 and Q2. This voltage between the points A and B will exist, even if the source F is switched off, due to the voltage induced in the coils B1, B2 of motor M by rotation of the rotor, said saturation state of the transistors Q1 and Q2 continuing for a certain time, even with no voltage being present between the terminals T1 and T2, due to the fact that the voltage existing in the fourth capacitor C4 is superior to the saturation level of the junction of the second capacitor C2. This additional conduction time of the transistors Q1 and Q2, with no voltage between the terminals T1 and T2 is defined by the time constant and R4. This characteristic of the blocking circuit BL of keeping its conduction state even with no voltage supplied by the source F and for an additional time after the movement of the motor has been substantially or completely reduced, when the voltage between points A and B is already at a very low level, makes the starting device DP become immune to voltage cut offs in the supply source, with no risk of activating triac S when the running capacitor Cp has a high voltage.

The invention claimed is:

1. An electronic circuit for starting a single phase induction motor, of the type containing a rotor and a stator with at least one running coil and one starting coil, for operating jointly with an alternating current source, comprising:
   a trigger electronic switch;
   a running capacitor connected in series with the starting coil and in parallel with the trigger electronic switch;
   a trigger circuit of said trigger electronic switch; and
   a blocking circuit for controlling the trigger pulses of the trigger electronic switch;
   wherein the blocking circuit sustains its blocking state while there is voltage being induced to the coils of the motor by rotation of the rotor, and maintains said blocking state for a certain time after said induced voltage has been substantially reduced while the motor is powered on.

2. The electronic circuit according to claim 1, characterized in that the blocking circuit (BL) includes electronic switch elements that are kept in a situation of blocking the trigger pulses of the trigger electronic switch, by means of a timer of said blocking circuit (BL).

3. The electronic circuit according to claim 2, characterized in that the electronic switch elements are kept in a blocking situation by voltage saturation.

4. The electronic circuit, according to claim 3, characterized in that the electronic switch elements are transistors (Q1, Q2).

5. The electronic circuit according to claim 4, characterized in that the timer is a charge element.

6. The electronic circuit according to claim 5, characterized in that the timer is supplied by the trigger circuit (TR).

7. The electronic circuit according to claim 6, characterized in that the trigger electronic switch is a triac having a first anode connected to a terminal of the alternating current source, a second anode connected to the starting coil of the motor and to a terminal of a running capacitor connected in series with the starting coil, and a trigger terminal connected to the trigger circuit.

8. The electronic circuit according to claim 7, characterized in that the trigger circuit (TR) comprises a first capacitor (C1) having one of its terminals connected to the second anode (A2) of the triac (S), another terminal connected to a terminal of a first resistor (R1), the other terminal of said first resistor (R1) being connected to the anode of a first Zener diode (Z1), whose cathode is connected to the cathode of a second Zener diode (Z2), the anode of said second Zener diode (Z2) being connected to the trigger terminal (G) of the triac (S).

9. The electronic circuit according to claim 8, characterized in that the trigger terminal (G) of triac (S) is connected to a first terminal of a second capacitor (C2) of the starting circuit (TR), with the second terminal thereof being connected to the first anode (A1) of the triac (S).

10. The electronic circuit according to claim 9, characterized in that the first and second Zener diodes (Z1, Z2) have a Zener voltage that is high enough to avoid current conduction across said Zener diodes (Z1, Z2) when the blocking circuit (BL) is in its blocking state.

11. The electronic circuit according to claim 10, characterized in that the Zener voltage of the first and second Zener diodes (Z1, Z2) is higher than 5 volts.

12. The electronic circuit according to claim 11, characterized in that the blocking circuit (BL) is formed by a complete rectifier bridge, having: a first input terminal connected to a common point connecting the anode of the first Zener diode (Z1) and the first capacitor (C1); a second input terminal connected to the first anode (A1) of the triac (S); a positive output terminal connected to a terminal of a second resistor (R2), to a terminal of a third capacitor (C3), to the emitter of a first transistor (Q1), to a terminal of a fifth capacitor (C5), and to the anode of a third rectifier diode (D3); a negative output terminal connected to the other terminal of the second resistor (R2), to the anode of a first rectifier diode (D1), to the terminal of a fourth capacitor (C4), to the terminal of a third resistor (R3) and to the emitter of a second transistor (Q2), the cathode of the first rectifier diode (D1) being connected to the other terminal of the third capacitor (C3) and to the anode of a second rectifier diode (D2), the cathode of said second rectifier diode (D2) being connected to the other terminal of the fourth capacitor (C4), to the other terminal of the third resistor (R3), to a terminal of a fourth resistor (R4), and to the collector of the first transistor (Q1), the other terminal of the fourth resistor (R4) being connected to the base of the second transistor (Q2), the base of the first transistor (Q1) being connected to the other terminal of the fifth capacitor (C5) and to a terminal of a fifth resistor (R5), the other terminal of said fifth resistor R5 being connected to the collector of the second transistor (Q2) and to the cathode of a fourth rectifier diode (D4), the anode of said fourth rectifier diode (D4) being connected to the cathode of the third rectifier diode (D3).

13. The electronic circuit according to claim 12, characterized in that the first transistor (Q1) is of the PNP type and the second transistor (Q2) is of the NPN type.

14. The electronic circuit, according to claim 12, characterized in that the timer is defined by the fourth capacitor (C4).

15. An electronic circuit for starting a single phase induction motor, of the type containing a rotor and a stator with at least one running coil and one starting coil, for operating jointly with an alternating current source, comprising:
    a trigger electronic switch including a trigger circuit; and
    a blocking circuit operable to control trigger pulses from the trigger electronic switch including electronic switch element transistors and a charge element timer supplied by the trigger circuit, wherein the electronic switch element blocks the trigger pulses in coordination with the timer, and the electronic switch elements are kept in a blocking situation by voltage saturation;
    wherein the blocking circuit sustains its blocking state while there is voltage being induced to the coils of the motor by rotation of the rotor, and maintains said blocking state for a certain time after said induced voltage has been substantially reduced while the motor is powered on, and
    wherein the trigger electronic switch is a triac having a first anode connected to a terminal of the alternating current source, a second anode connected to the starting coil of the motor and to a terminal of a running capacitor connected in series with the starting coil, and a trigger terminal connected to the trigger circuit.

16. An electronic circuit for starting a single phase induction motor, of the type containing a rotor and a stator with at least one running coil and one starting coil, for operating jointly with an alternating current source, comprising:
    a trigger electronic switch, wherein the electronic switch is a triac;
    a trigger circuit of said trigger electronic switch; and
    a blocking circuit for controlling the trigger pulses of the trigger electronic switch;

wherein the trigger circuit includes a first capacitor having a first terminal connected to an anode of the triac, and a second terminal of the capacitor connected to a terminal of a first resistor, a second terminal of the first resistor is connected to an anode of a first Zener diode, a cathode of the first Zener diode connected to a cathode of a second Zener diode, an anode of the second Zener diode connected to a trigger terminal of the triac;

wherein the blocking circuit includes a complete rectifier bridge having a first input terminal connected to a common point connecting to the anode of the first Zener diode and the first capacitor; a second input terminal connected to the first anode of the triac; a positive output terminal connected to: a terminal of a second resistor, a first terminal of a third capacitor, an emitter of a first transistor, a first terminal of a fifth capacitor, and to an anode of a third rectifier diode; a negative output terminal connected to: a second terminal of the second resistor, an anode of a first rectifier diode, a first terminal of a fourth capacitor, a first terminal of a third resistor, and to an emitter of a second transistor; a cathode of the first rectifier diode connected to: a second terminal of the third capacitor and an anode of a second rectifier diode; a cathode of the second rectifier diode connected to: a second terminal of the fourth capacitor, the second terminal of the third resistor, a first terminal of a fourth resistor, and a collector of the first transistor; a second terminal of the fourth resistor connected to a base of the second transistor; a base of the first transistor connected to a second terminal of the fifth capacitor and to a first terminal of a fifth resistor; a second terminal of the fifth transistor connected to a collector of the second transistor and to a cathode of a fourth rectifier diode; an anode of the fourth rectifier diode connected to a cathode of the third rectifier diode; the blocking circuit sustains its blocking state while there is voltage being induced to the coils of the motor by rotation of the rotor, maintaining said blocking state for a certain time after said induced voltage has been substantially reduced.

17. The electronic circuit of claim 16, wherein the first transistor is of the PNP type, and the second transistor is of the NPN type.

18. The electronic circuit of claim 16, wherein the fourth capacitor defines a time constant for the blocking circuit.

19. The electronic circuit according to claim 16, wherein the triac first anode is connected to a terminal of an alternating current source, and the triac second anode is connected to the starting coil of the motor and to a terminal of a running capacitor connected in series with the starting coil, and a trigger terminal connected to the trigger circuit.

20. An electronic circuit for starting a single phase induction motor, of the type containing a rotor and a stator with at least one running coil and one starting coil, for operating jointly with an alternating current source, comprising:
 a trigger electronic switch includes a triac having a first anode connected to a terminal of the alternating current source, a second anode connected to the starting coil of the motor and to a terminal of a running capacitor connected in series with the starting coil and in parallel with the triac, and a trigger terminal connected to a trigger circuit;
 a blocking circuit for controlling the trigger pulses of the trigger electronic switch;
 the blocking circuit including transistors that are kept in voltage saturation so as to block the trigger pulses of the trigger electronic switch, by means of a timer charge element of said blocking circuit;
 wherein the timer is supplied by the trigger circuit, and wherein the blocking circuit sustains its blocking state while there is voltage being induced to the coils of the motor by rotation of the rotor, and maintains said blocking state for a certain time after said induced voltage has been substantially reduced while the motor is powered on.

21. An electronic circuit for starting a single phase induction motor, the motor being of the type containing a rotor and a stator with at least one running coil and one starting coil for operating jointly with an alternating current source, the electronic circuit comprising:
 a trigger electronic switch;
 a trigger circuit of the trigger electronic switch; and
 a blocking circuit for controlling the trigger pulses of the trigger electronic switch, the blocking circuit being electrically connected to the trigger circuit,
 wherein the blocking circuit is operable to sustain a respective blocking state while there is voltage being induced to the coils of the motor by rotation of the rotor, thereby maintaining the blocking state for a certain time after said induced voltage has been substantially reduced while the motor is powered on.

22. The electronic circuit according to claim 1, wherein the blocking circuit is electrically connected to the trigger circuit.

23. The electronic circuit according to claim 15, wherein the blocking circuit is electrically connected to the trigger circuit.

24. The electronic circuit according to claim 20, wherein the blocking circuit is electrically connected to the trigger circuit.

* * * * *